(12) United States Patent
Abad et al.

(10) Patent No.: US 11,373,022 B2
(45) Date of Patent: Jun. 28, 2022

(54) DESIGNING A STRUCTURAL PRODUCT

(71) Applicant: The Boeing Company, Chicago, IL (US)

(72) Inventors: Samir Abad, Bellevue, WA (US); Chandrashekar Subraya, Bellevue, WA (US); Venkata Narasimha Ravi Udali, Bothell, WA (US); Rajesh Babu Thanikonda, Everett, WA (US)

(73) Assignee: The Boeing Company, Chicago, IL (US)

( * ) Notice: Subject to any disclaimer, the term of this patent is extended or adjusted under 35 U.S.C. 154(b) by 549 days.

(21) Appl. No.: 16/220,615

(22) Filed: Dec. 14, 2018

(65) Prior Publication Data

US 2020/0192990 A1    Jun. 18, 2020

(51) Int. Cl.
    *G06F 17/10*     (2006.01)
    *G06F 30/23*     (2020.01)
    *G06F 30/17*     (2020.01)

(52) U.S. Cl.
    CPC ............. *G06F 30/23* (2020.01); *G06F 30/17* (2020.01)

(58) Field of Classification Search
    CPC ............................... G06F 30/17; G06F 30/23
    USPC ............................................................. 703/1
    See application file for complete search history.

(56) References Cited

U.S. PATENT DOCUMENTS

| | | | | |
|---|---|---|---|---|
| 2003/0154451 | A1* | 8/2003 | Rassaian | G06F 30/23 703/7 |
| 2005/0091010 | A1* | 4/2005 | Fox | G06T 17/20 703/1 |
| 2017/0154150 | A1* | 6/2017 | Schaefer | B33Y 80/00 |
| 2018/0165408 | A1* | 6/2018 | Ma | G06F 30/23 |

FOREIGN PATENT DOCUMENTS

EP     2887241 A1     6/2015

OTHER PUBLICATIONS

Extended European Search Report from related European Patent Appl. No. 19213211.6, dated May 4, 2020.

* cited by examiner

*Primary Examiner* — Andre Pierre Louis
(74) *Attorney, Agent, or Firm* — Womble Bond Dickinson (US) LLP

(57) ABSTRACT

An apparatus for designing a structural product is provided. The apparatus accesses a computer-aided design (CAD) model that represents a first design of the structural product by a first geometry and accesses a finite element method (FEM) model that represents a second design of the structural product by a mesh of elements arranged in a second geometry. The apparatus performs a comparison of the CAD model and the FEM model to determine a similarity between the first geometry and the second geometry and produces a resulting FEM model based on the similarity, and that represents the first design of the structural product. The apparatus performs a finite element analysis on the resulting FEM model and performs a classical analysis to evaluate the (Continued)

first design of the structural product, produces an output based on the classical analysis, and displays the output to facilitate design of the structural product.

21 Claims, 12 Drawing Sheets

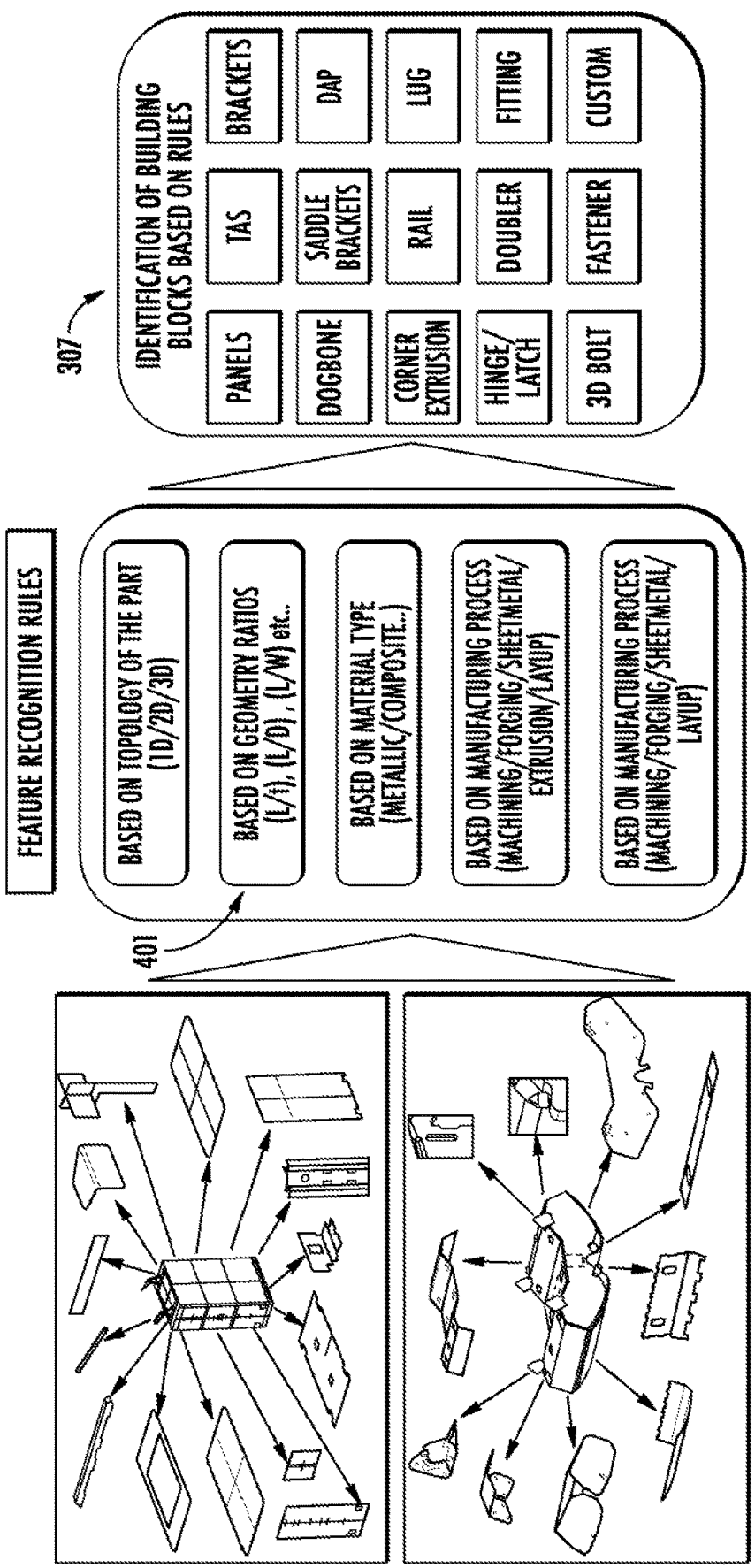

DESIGNING A STRUCTURAL PRODUCT

TECHNOLOGICAL FIELD

The present disclosure relates generally to designing a structural product, and in particular, to designing a structural product using a combination of finite element analysis and classical analysis.

BACKGROUND

Finite element analysis supplemented with classical methods can be utilized to perform structural analysis to facilitate the design of structural products. Existing solutions of structural analysis for structural products involve significant manual effort to create finite element method (FEM) models from computer-aided design (CAD) models, decompose complex CAD models into individual components, and perform analysis and post processing of data. For example, the manual meshing process of individual CAD components to create the FEM model can take several weeks. Also, the manual extraction of loads from FEM models can be error prone and time consuming.

Therefore, it would be desirable to have a system and method that takes into account at least some of the issues discussed above, as well as other possible issues.

BRIEF SUMMARY

Example implementations of the present disclosure are directed to designing a structural product using finite element analysis. Example implementations can access a computer-aided design (CAD) model that represents a first design of the structural product by first geometry and access a finite element method (FEM) model that represents a second design of the structural product by a mesh of elements arranged in a second geometry. Example implementations can perform a comparison of the CAD model and the FEM model to determine a similarity between the first geometry and the second geometry. Example implementations can produce a resulting FEM model based on the similarity, and that represents the first design of the structural product by another mesh of elements arranged in the first geometry. Example implementations can perform a finite element analysis on the resulting FEM model to evaluate the first design of the structural product, produce the output loads based on the finite element analysis, evaluate the output loads using classical methods and display the output sizing results to facilitate design of the structural product.

Example implementations can provide multiple advantages over existing solutions. For example, CAD to FEM data exchange is a highly manual and repetitive process that often results in significant data loss. Example implementations can prevent data loss by carrying over rich CAD data to help streamline downstream analysis. Also, parametric CAD model changes often require significant FEM model changes. Example implementations can utilize parametric mesh morphing that enables morphing of current meshes to target new geometries. The parametric mesh morphing can achieve significant flow time reduction for structural analysis. Moreover, finite element analysis may pose challenges for post-processing and visualization of data involving multiple load cases and critical failure zones. Example implementations can incorporate adaptive visualization scheme that maps classical analysis results and loads data onto CAD models to enable effective visualization of analysis results.

The present disclosure thus includes, without limitation, the following example implementations.

Some example implementations provide a method of designing a structural product, comprising: accessing a computer-aided design (CAD) model that represents a first design of the structural product by a first geometry; accessing a finite element method (FEM) model that represents a second design of the structural product by a mesh of elements arranged in a second geometry; performing a comparison of the CAD model and the FEM model to determine a similarity between the first geometry and the second geometry; producing a resulting FEM model based on the similarity, and that represents the first design of the structural product by another mesh of elements arranged in the first geometry; performing a finite element analysis on the resulting FEM model to extract loads from the FEM model and performing a classical analysis to evaluate the first design of the structural product; producing an output based on the classical analysis; and displaying the output to facilitate design of the structural product.

In some example implementations of the method of any preceding example implementation, or any combination of preceding example implementations, performing the comparison includes performing the comparison to determine at least a threshold similarity between the first geometry and the second geometry, and producing the resulting FEM model includes performing mesh morphing to modify the mesh of the FEM model to produce a morphed mesh that corresponds to the other mesh, and by which the resulting FEM model represents the first design of the structural product.

In some example implementations of the method of any preceding example implementation, or any combination of preceding example implementations, performing the comparison includes performing the comparison to determine less than a threshold similarity between the first geometry and the second geometry, and wherein producing the resulting FEM model includes: decomposing the CAD model into building blocks corresponding to a plurality of components of the structural product; producing respective FEM models for the building blocks and thereby the plurality of components; and assembling the respective FEM models with one or more connectors to produce the resulting FEM model.

In some example implementations of the method of any preceding example implementation, or any combination of preceding example implementations, decomposing the CAD model includes classifying the building blocks into respective categories based on features of the building blocks, and producing the respective FEM models includes producing the respective FEM models based on the respective categories of the building blocks.

In some example implementations of the method of any preceding example implementation, or any combination of preceding example implementations, the method further comprises performing the classical analysis on the respective FEM model to verify the plurality of components, and producing the output includes producing the output based on the finite element analysis and the classical analysis.

In some example implementations of the method of any preceding example implementation, or any combination of preceding example implementations, the output includes safety margins of the first design of the structural product, and displaying the output includes displaying a visual representation of the safety margins on the CAD model.

In some example implementations of the method of any preceding example implementation, or any combination of preceding example implementations, the structural product includes one or more interior commodities of an aircraft, and displaying the output to facilitate design of the structural product includes displaying the output to facilitate design of the one or more interior commodities.

Some example implementations provide an apparatus for designing a structural product. The apparatus comprises a processor and a memory storing executable instructions that, in response to execution by the processor, cause the apparatus to at least perform the method of any preceding example implementation, or any combination of any preceding example implementations.

Some example implementations provide a computer-readable storage medium for designing a structural product. The computer-readable storage medium is non-transitory and has computer-readable program code stored therein that in response to execution by a processor, causes an apparatus to at least perform the method of any preceding example implementation, or any combination thereof.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

FIGS. 4A, 4B and 4C illustrate decomposition rules used in the geometry decomposition, according to example implementations of the present disclosure;

DETAILED DESCRIPTION

Figure 1:
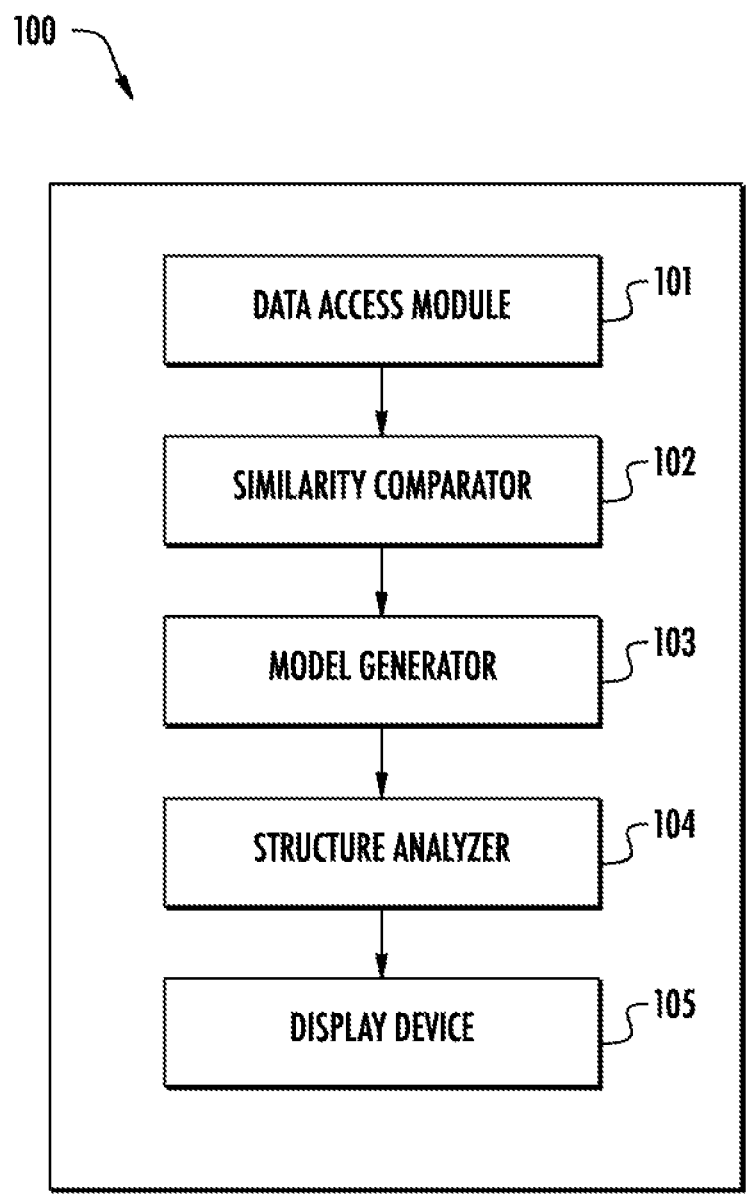
FIG. 1 illustrates a system for designing a structural product, according to example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure are generally directed to designing a structural product, and in particular, to designing a structural product using finite element analysis.

FIG. 1 illustrates a system 100 for designing a structural product, according to example implementations of the present disclosure. In some examples, as described in greater detail with reference to FIG. 10, the system may be implemented by an apparatus for designing a structural product. Example implementations will be primarily described in the context of designing an aircraft or other vehicle or system, or components or assemblies thereof. In the case of aircraft in particular, example implementations may be applied to design one or more interior commodities of an aircraft, such as closets, stow bins, crew rest, and the like. It should be understood that example implementation may be applied in the design of a number of other structural products.

The system 100 includes any of a number of different subsystems (each an individual system) for performing one or more functions or operations. As shown, in some examples, the system includes one or more of each of a data access module 101, a similarity comparator 102, a model generator 103, a structure analyzer 104 and a display device 105. The subsystems may be co-located or directly coupled to one another, or in some examples, various ones of the subsystems may communicate with one another across one or more computer networks. Further, although shown as part of the system, it should be understood that any one or more of the data access module, similarity comparator, model generator, structure analyzer and display device may function or operate as a separate system without regard to any of the other subsystems. It should also be understood that the system may include one or more additional or alternative subsystems than those shown in FIG. 1.

In some examples, the data access module 101 is configured to access a computer-aided design (CAD) model that represents a first design of the structural product by a first geometry, and a finite element method (FEM) model that represents a second design of the structural product by a mesh of elements arranged in a second geometry. The CAD model may be provided by customers indicating a customer-requested, first design of the structural product. The second design may be an available design represented by the FEM model in a database. In this regard, the CAD model and FEM model can be stored in the same or different databases such that the data access module can access the CAD model from the database(s).

In order to perform a structural analysis on the CAD model, in some examples, the similarity comparator 102 is configured to perform a comparison of the CAD model and the FEM model to determine a similarity between the first geometry and the second geometry. For example, the similarity comparator can compare the shapes and/or dimensions between the first geometry and the second geometry to determine the similarity.

After the similarity between the first geometry and the second geometry is determined, in some examples, the model generator 103 is configured to produce a resulting FEM model based on the similarity. The resulting FEM model represents the first design of the structural product by another mesh of elements arranged in the first geometry.

In some examples in which the first geometry and the second geometry have at least a threshold similarity, the model generator 103 is configured to perform mesh morphing to modify the mesh of the FEM model to produce a morphed mesh. The morphed mesh corresponds to the other mesh, and by which the resulting FEM model represents the first design of the structural product. For example, the model generator can perform mesh morphing to smoothly and gradually modify the FEM model accessed by the data access module 101 to produce a morphed mesh. The morphed mesh may represent the first design of the structural product. The resulting FEM model may be built using the morphed mesh to represent the first design of the structural product.

In some examples in which the first geometry and the second geometry have less than a threshold similarity, the model generator 103 is configured to decompose the CAD model into building blocks corresponding to a plurality of components of the structural product. The model generator is also configured to produce respective FEM models for the building blocks and thereby the plurality of components. The model generator is further configured to assemble the respective FEM models with one or more connectors to produce the resulting FEM model.

In order to decompose the CAD model into building blocks, in some examples, the model generator 103 is configured to classify the building blocks into respective categories based on features of the building blocks. The model generator is also configured to produce the respective FEM models based on the respective categories of the building blocks. Classifying the building blocks into respective categories will be described in greater details with reference to FIG. 3 below.

After the resulting FEM model is produced, in some examples, the structure analyzer 104 is configured to perform a finite element analysis on the resulting FEM model to extract loads from the FEM model. The structure analyzer is also configured to perform a classical analysis to evaluate the first design of the structural product. Classical analysis defines the determination of the effects of loads on physical structures and their components and studies the impact of structural deformation and failure modes. For example, the structure analyzer can perform a structural analysis on the resulting FEM model. The structural analysis can be used to evaluate whether the first design of the structural product meets the design requirements and/or criteria and can be manufactured. In these examples, the structure analyzer is configured to produce an output based on the classical analysis. Also, in these examples, the display device 105 is configured to display the output to facilitate design of the structural product. After the first design of the structural product is verified, the structural product can be manufactured based on the first design. The structure analyzer can post process finite element analysis results to extract critical loads and produce the final margin of safety summary output based on classical analysis method. The structure analyzer can perform finite element analysis on the resulting FEM model to calculate internal loads of the first design. The structure analyzer can produce the output based on loads extracted from the finite element analysis.

In some examples, after the model generator 103 produces the respective FEM models for the building blocks, the structure analyzer 104 is further configured to perform classical analysis on the respective FEM models to verify the plurality of components. Classical analysis can use mathematical and/or empirical assumptions to evaluate or determine the structural integrity of the design of the structural product. Loads can be extracted from finite element analysis and classical methods can be used to actually size the structure of the structural product. The classical methods can be developed based on mechanics of materials, structural testing, etc. In these examples, the structure analyzer is configured to produce the output based on the finite element analysis and the classical analysis. Also, in these examples, the output includes safety margins of the first design of the structural product, and the display device 105 is configured to display a visual representation of the safety margins on the CAD model.

Figure 2:
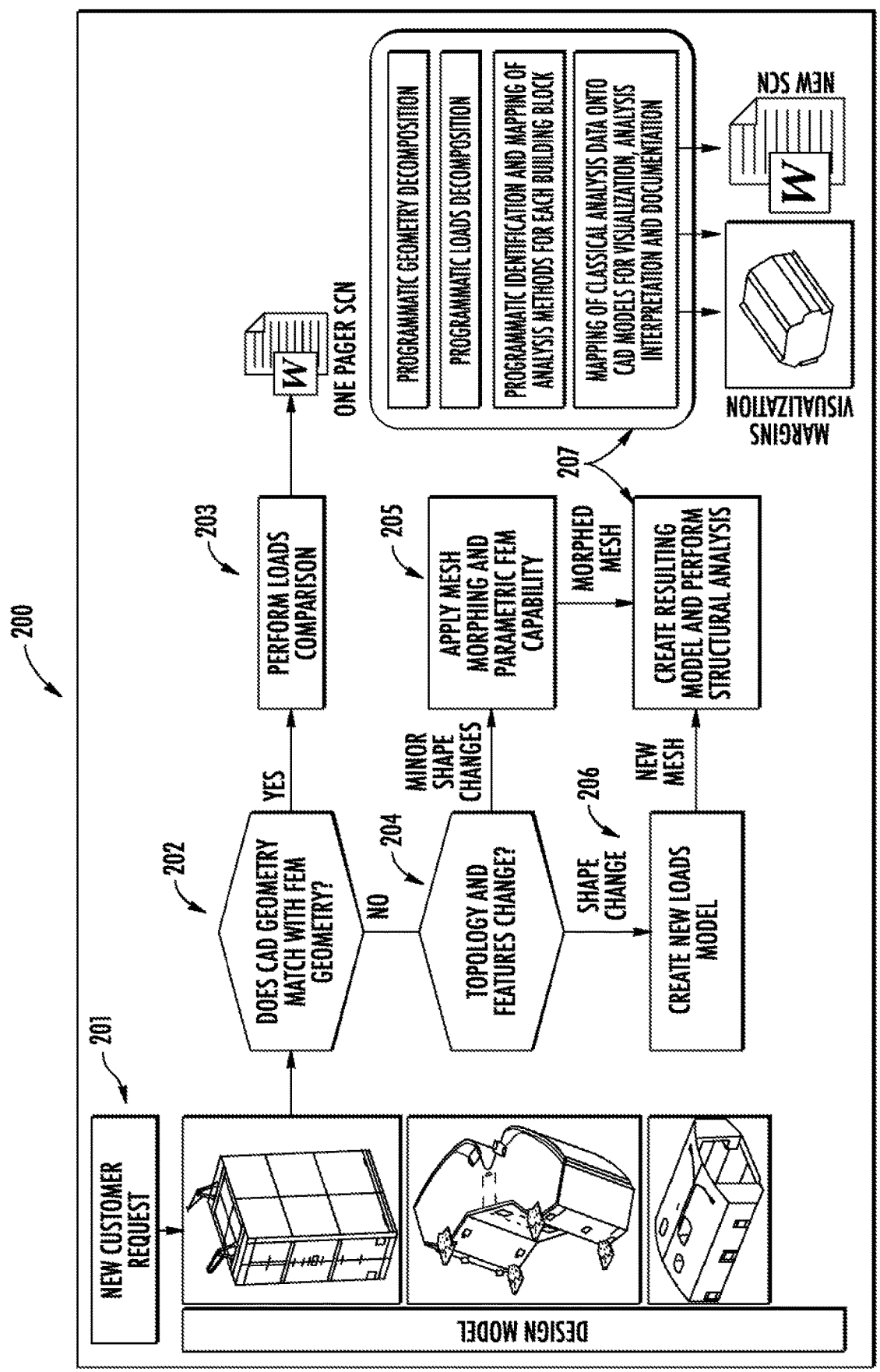
FIG. 2 illustrates a flowchart for a method of designing a structural product, according to example implementations of the present disclosure.

FIG. 2 illustrates a flowchart for a method 200 of designing a structural product, according to example implementations of the present disclosure. As shown, at block 201, the system 100 can receive a new customer request to manufacture a structural product such as a closet, a stow bin or a crew rest of an aircraft based on a customer-provided design. The customer-provided design may be represented by a CAD model with a first geometry. At block 202, the system can determine whether geometry of the CAD model matches an existing FEM model in a database. If so, at block 203, the system can perform loads comparison between the CAD model and the existing FEM model and produce one pager strength check notes (SCN).

On the other hand, if at block 202, the system 100 determines that the geometry of the CAD model does not match any existing FEM model in the database, the method 200 proceeds to block 204. At block 204, the data access module 101 can access a FEM model that represents a different design (i.e., the second design) of the structural product with a second geometry. The similarity comparator 102 can perform a comparison of the CAD model and the FEM model to determine a similarity between the first geometry and the second geometry, e.g., by comparing topology, shape, and/or feature changes between the first geometry and the second geometry.

If at block 204, the similarity comparator 102 determines that the changes between the first geometry and the second geometry are minor, i.e., the first geometry and the second geometry have a threshold similarity between each other, then the method 200 proceeds to block 205. At block 205, the model generator 103 can apply mesh morphing to modify the mesh of the FEM model to produce a morphed mesh that corresponds to the first design of the structural product.

If at block 204, the similarity comparator 102 determines that the changes between the first geometry and the second geometry are significant, i.e., the similarity between the first geometry and the second geometry is less than a threshold similarity between each other, then the method 200 proceeds to block 206. At block 206, the model generator 103 can create a new loads model for the structural product with a new mesh.

After the morphed mesh or the new mesh is produced, the method 200 proceeds to block 207 from block 205 or 206. At block 207, the model generator 103 can create a resulting FEM model for the structural product and the structure analyzer 104 can perform a structural analysis for the structural product. In one example, at block 207, the model generator 103 can perform programmatic geometry decomposition and/or programmatic loads decomposition. The programmatic geometry decomposition maybe performed only when the method 200 proceeds from block 206 to block 207. The structure analyzer can perform programmatic identification and mapping of analysis methods for each building block and/or mapping of classical analysis data onto CAD model for visualization, analysis interpretation and documentation. After the structural analysis for the structural product is finished, the structure analyzer 104 can produce a new SCN and the display device 105 can display a visual representation of safety margins on the CAD model.

Figure 3:
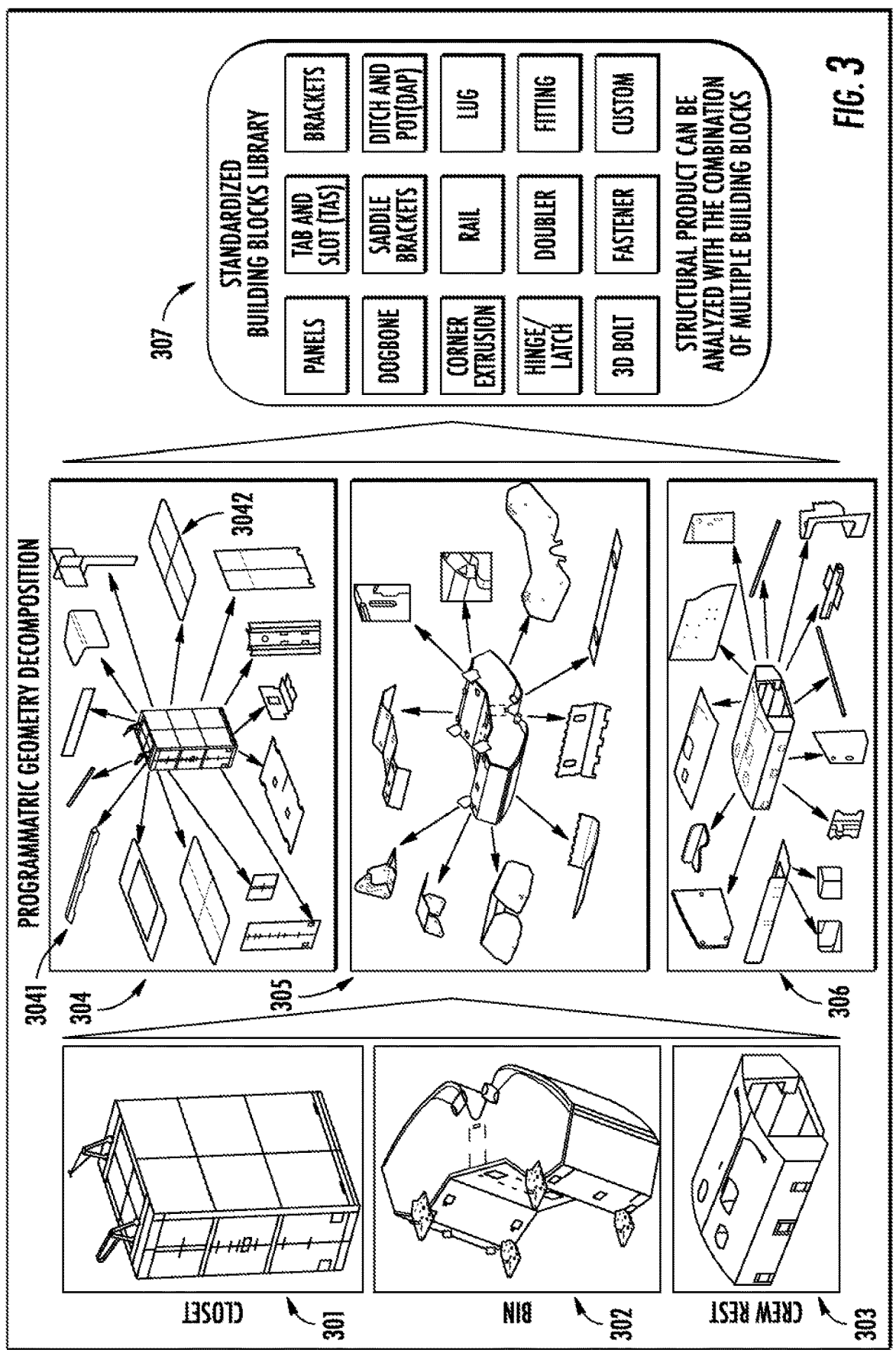
FIG. 3 illustrates geometry decomposition of a computer-aided design (CAD) model into building blocks, according to example implementations of the present disclosure.

FIG. 3 illustrates geometry decomposition of a CAD model into building blocks, according to example implementations of the present disclosure. As shown, the CAD model 301 of a closet can be decomposed into building blocks 304. Similarly, the CAD model 302 of a stow bin can be decomposed into building blocks 305, and the CAD model 303 of a crew rest can be decomposed into building blocks 306. The building blocks can be classified or categorized in a standard building block library 307. For example, building block 3041 can be categorized as a rail and building block 3042 can be categorized as a panel, or more specifically, a shell panel, in the standard building block library. After the geometry decomposition, the standard building block library may include all categorized building blocks corresponding to components of one or more structural products. In one example, the programmatic geometry decomposition as described in FIG. 3 may be performed only when the method 200 proceeds from block 206 to block 207, as explained above.

Figure 4B:
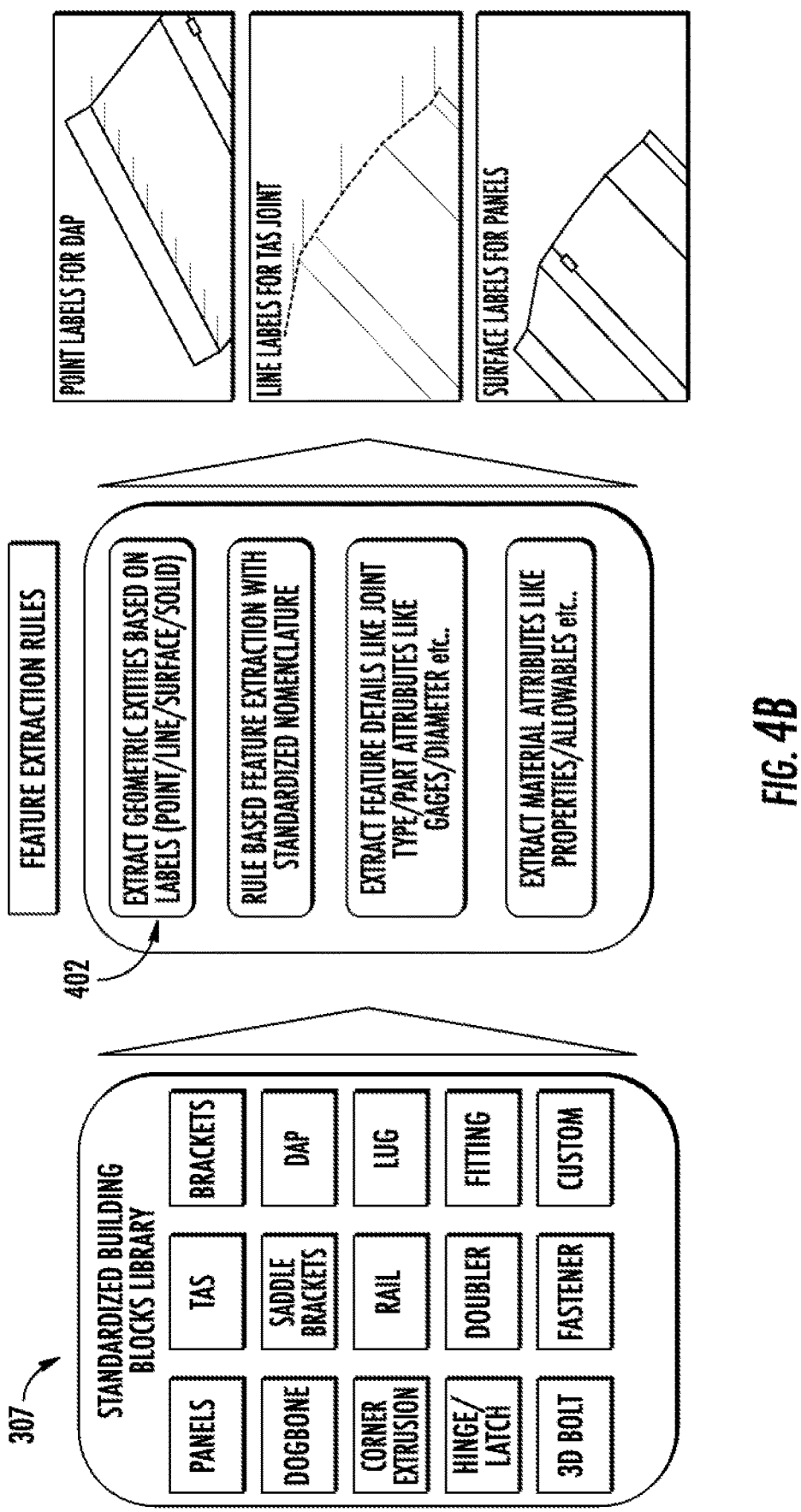
Figure 4C:
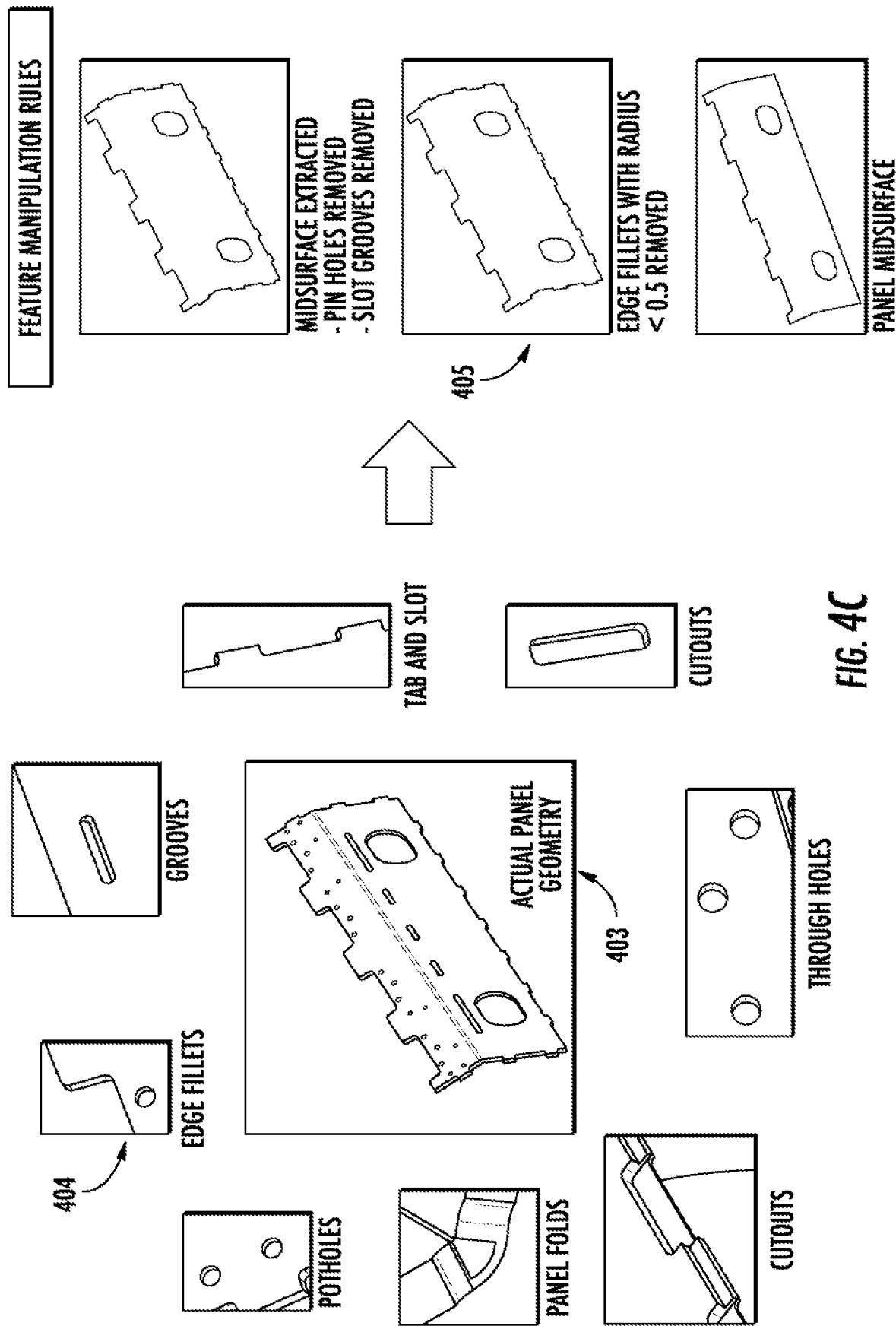

The programmatic geometry decomposition may be performed using decomposition rules. FIGS. 4A, 4B and 4C illustrate decomposition rules used in the geometry decomposition, according to example implementations of the present disclosure. FIG. 4A illustrates feature recognition rules used in the geometry decomposition. Using the feature recognition rules, the CAD model of the structural product can be decomposed into building blocks based on features of the components of the structural product. For example, the CAD model can be decomposed into building blocks based on geometry ratios such as length-to-thickness ratio (L/T), length-to-diameter ratio (L/D), length-to-width ratio (L/W) as indicated by arrow 401. The building blocks can be also categorized in the standard building block library 307 based on the feature recognition rules.

FIG. 4B illustrates feature extraction rules used in the geometry decomposition. Using the feature extraction rules, features of building blocks in the standard building block library 307 can be extracted. For example, features of building blocks can be extracted based on labels such as point labels, line labels, surface labels, and/or solid labels as indicated by arrow 402. The extracted features may be used in the structural analysis.

FIG. 4C illustrates feature manipulation rules used in the geometry decomposition. Using the feature manipulation rules, features of building blocks can be manipulated or modified. For example, the CAD model 403 of a building block (e.g., a panel) may include edge fillets 404. Using the feature manipulation rules, edge fillets with radius <0.5 inches can be removed to produce a simplified CAD model 405. The simplified CAD model 405 with less features can be used to produce a corresponding FEM model for the building block.

In one example, the model generator 103 can decompose the CAD model into building blocks corresponding to a plurality of components of the structural product using one or more of the feature recognition rules, feature extraction rules and feature manipulation rules.

Figure 5:
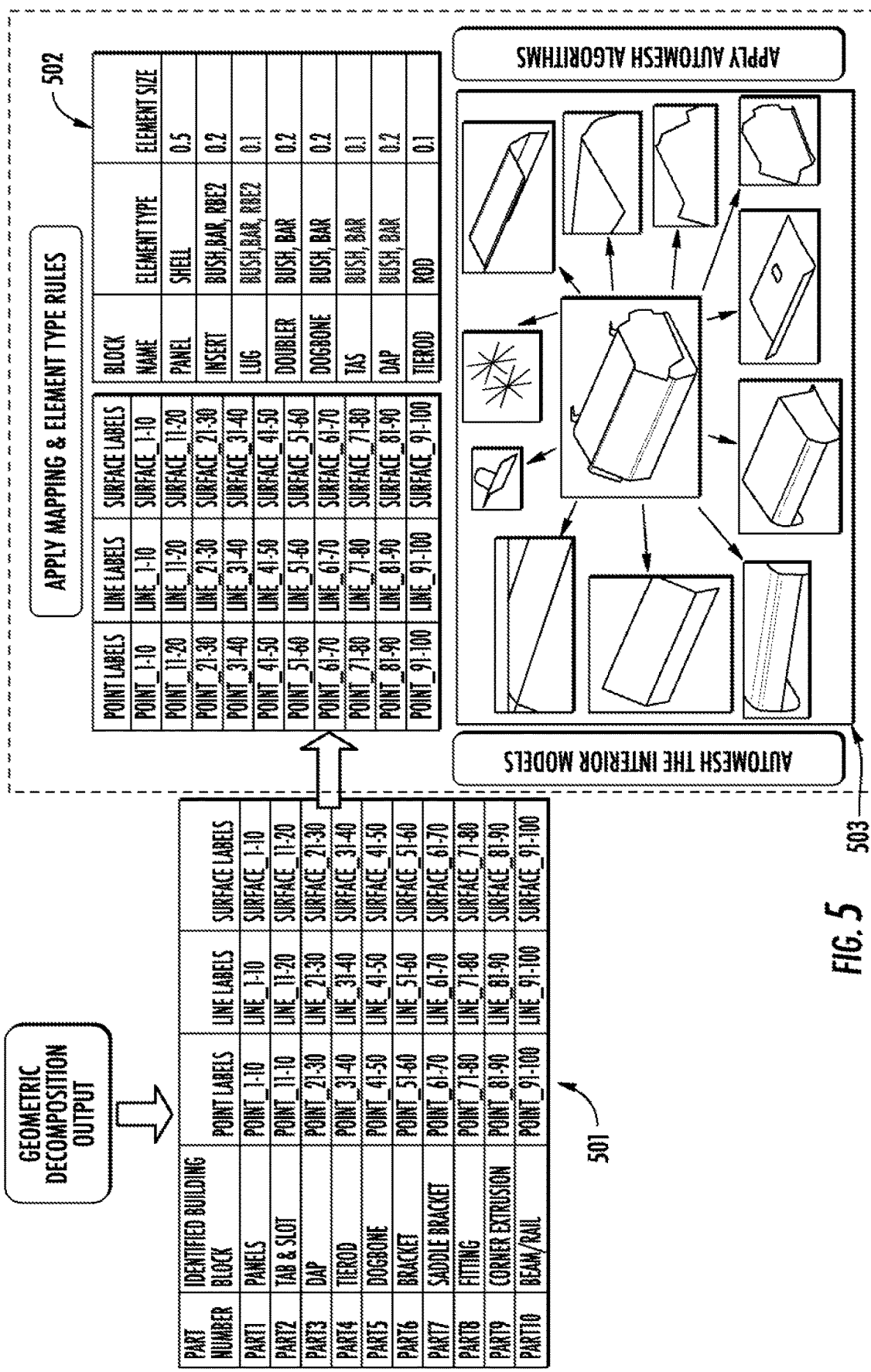
FIG. 5 illustrates generation of finite element method (FEM) models for the building blocks, according to example implementations of the present disclosure.

FIG. 5 illustrates generation of FEM models for the building blocks, according to example implementations of the present disclosure. As shown, output of the geometry decomposition can be used to produce a table 501. The table 501 may include part numbers, identified building blocks and extracted features of building blocks such as point labels, line labels and surface labels. Using the information in table 501, the model generator 103 can apply mapping and element type rules to identify element type and/or element size for each building block, as shown in table 502. For example, a panel may have an element type of shell and a length of 0.5 inches. The model generator can also apply algorithms to automatically generate meshes for each of the building blocks of the structural product. The generated FEM models for the building blocks can be indicated by block 503. In this way, the model generator can produce respective FEM models for the building blocks and then assemble the respective FEM models with one or more connectors to produce the resulting FEM model for the entire structural product.

Figure 6:
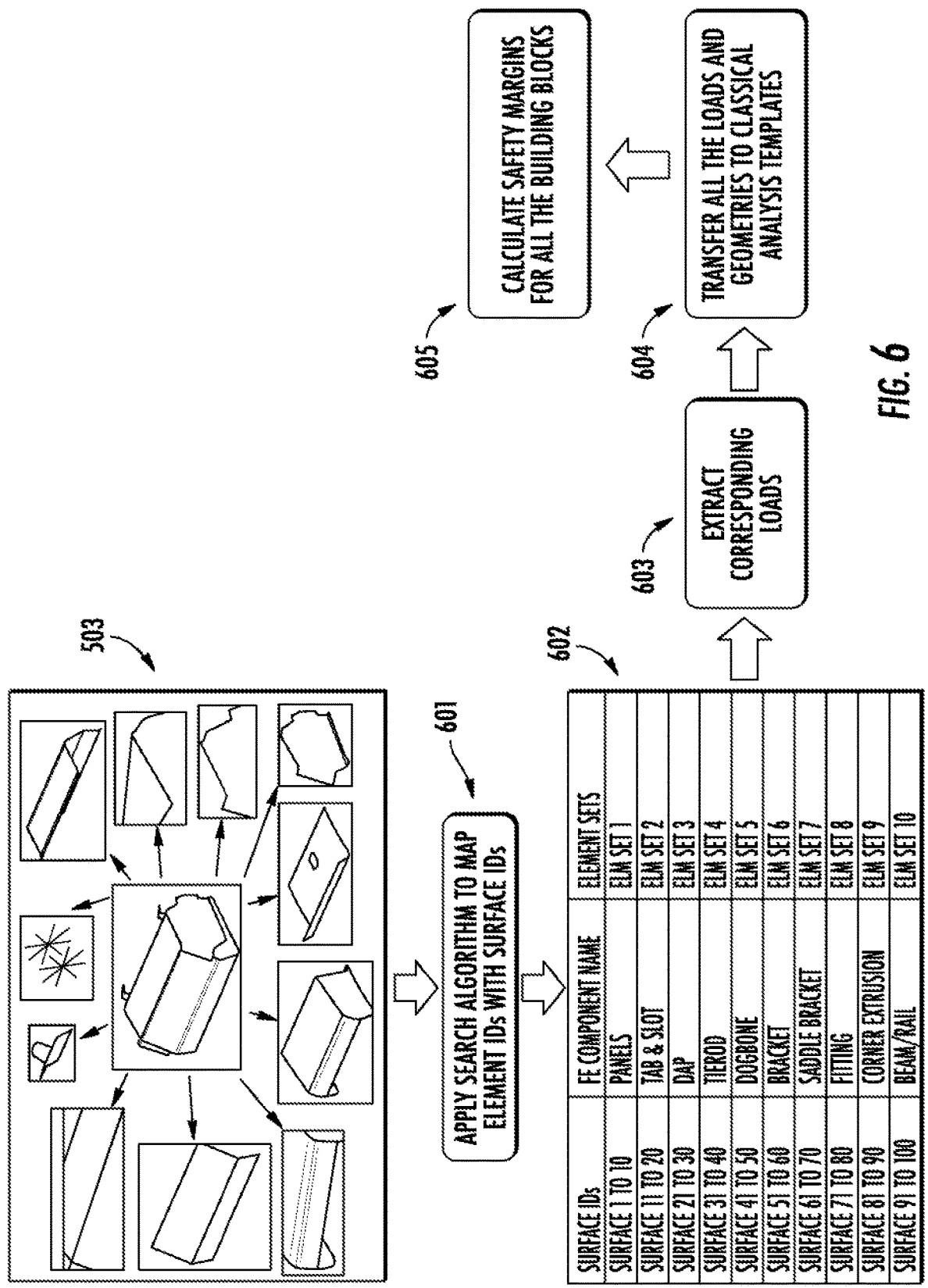
FIG. 6 illustrates a loads decomposition algorithm, according to example implementations of the present disclosure.

FIG. 6 illustrates a loads decomposition algorithm, according to example implementations of the present disclosure. As shown, after the FEM models for the building blocks are produced, the model generator 103 can provide the FEM models as indicated by block 503 to the structure analyzer 104 for implementing the loads decomposition algorithm. In one example, the loads decomposition algorithm starts from block 601. At block 601, the structure analyzer can apply search algorithms to map element IDs with surface IDs, as indicated by block 601, to produce a table 602. At block 603, the structure analyzer can use the information in the table 602 to extract loads from the FEM models of the building blocks. At block 604, the structure analyzer can transfer all the loads and geometries of the FEM models to classical analysis templates. Each of the building blocks may have a corresponding classical analysis template. At block 605, the structure analyzer can perform classical analysis on each of the respective FEM models to verify the design of the corresponding components of the structural product. At block 605, the structure analyzer can also calculate safety margins for all the building blocks corresponding to the components of the structural product.

Figure 7:
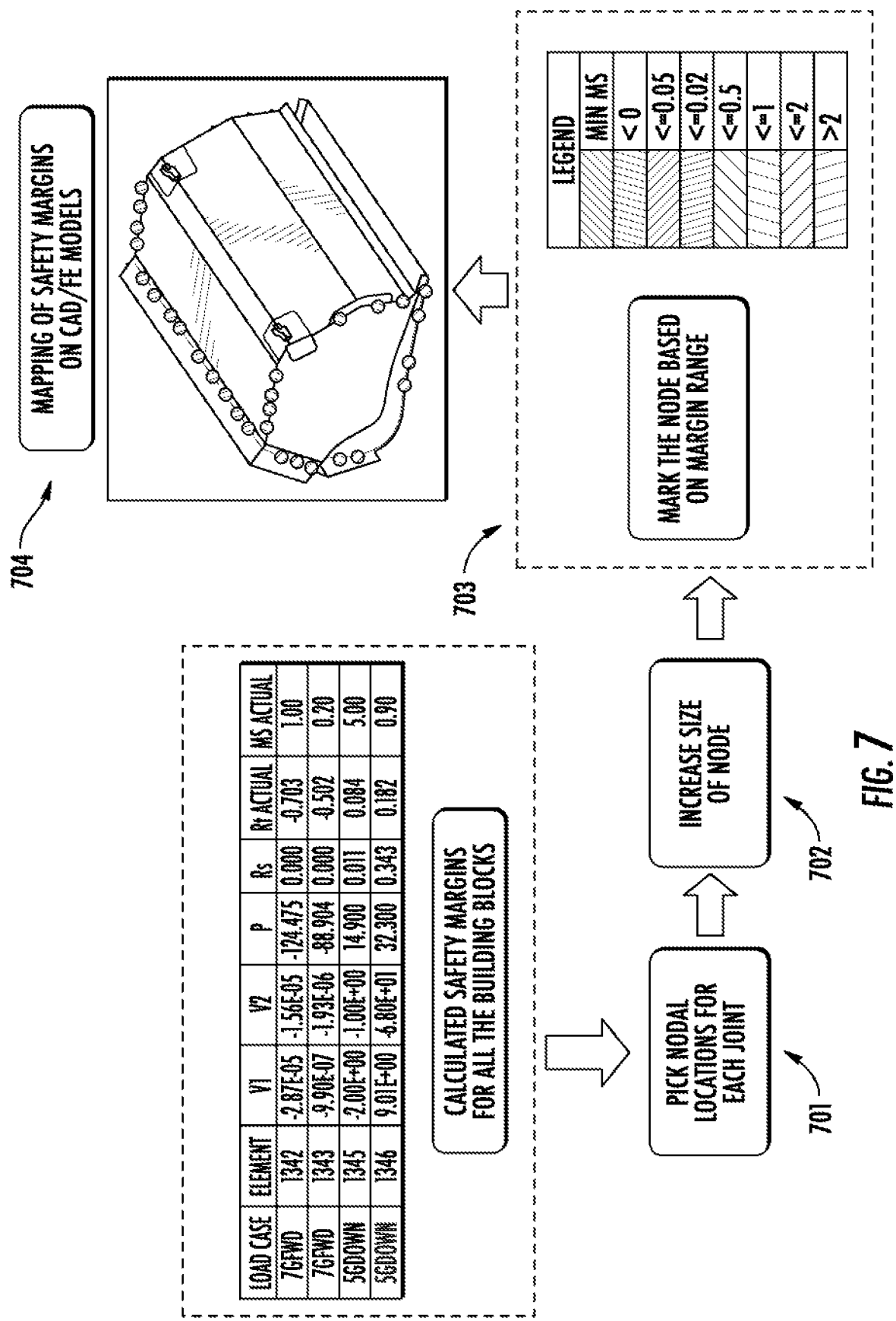
FIG. 7 illustrates mapping of classical analysis results onto a CAD model, according to example implementations of the present disclosure.

After the classical analysis results, e.g., the safety margins, for all the building blocks are produced or calculated, the results can be mapped on the CAD model of the structural product. FIG. 7 illustrates mapping of classical analysis results onto a CAD model, according to example implementations of the present disclosure. As shown, at block 701, the structure analyzer 104 can pick nodal locations for each joint. A joint can be a connection between two structural components and in the FEM model a joint can be represented by one-dimensional elements. At block 702, the structure analyzer can increase the size of the picked node. At block 703, the structure analyzer can mark the node using different colors or marks based on the margin range of the node. For example, the node can be marked indicating a larger margin of safety (MS) when the minimum MS has a larger value, such as >2. At block 704, the structure analyzer can map the safety margins on the CAD model of the structural product.

Figure 8:
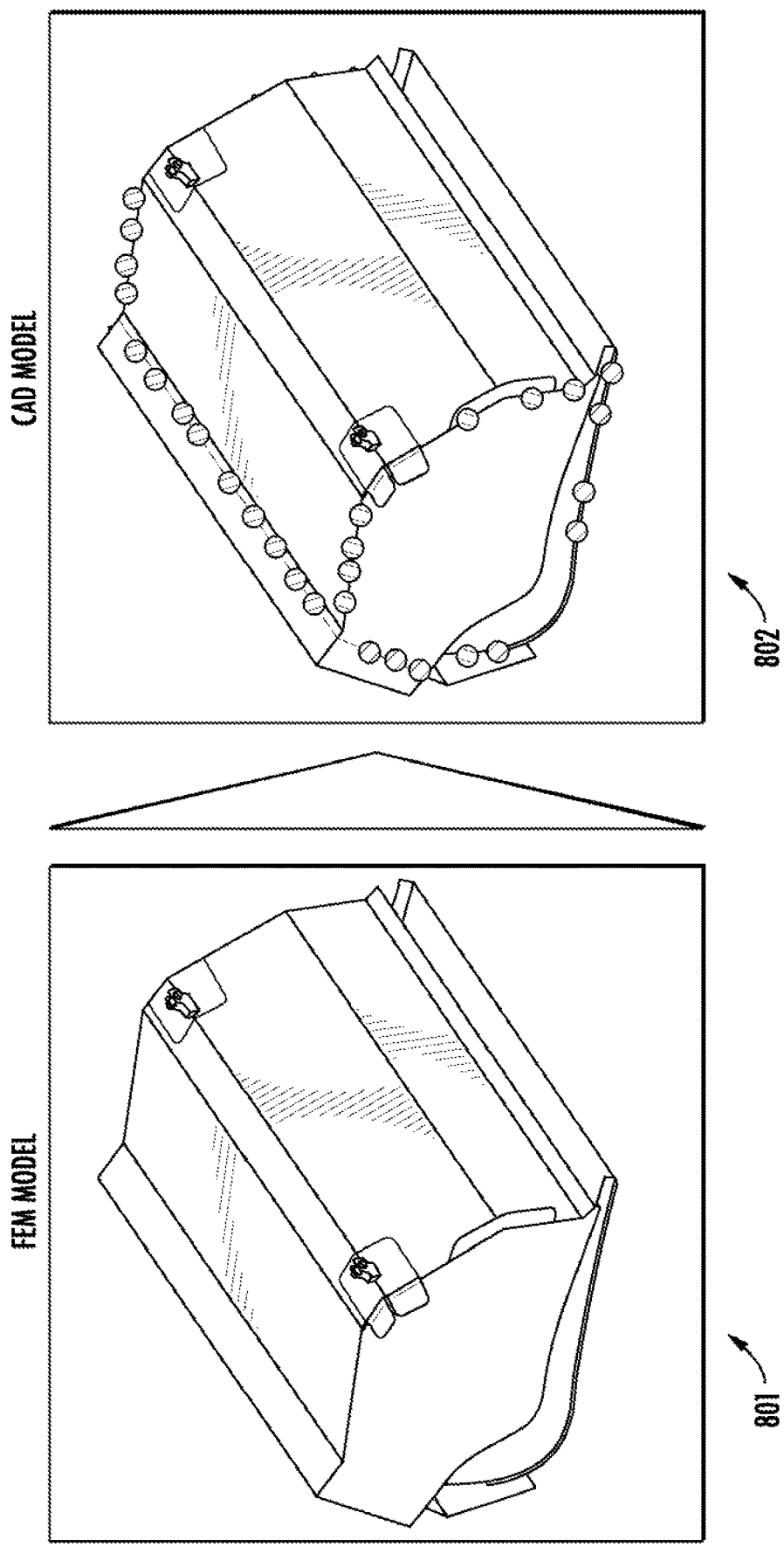
FIG. 8 illustrates a visual representation of classical analysis results on a CAD model, according to example implementations of the present disclosure.

FIG. 8 illustrates a visual representation of classical analysis results on a CAD model, according to example implementations of the present disclosure. In particular, FIG. 8 illustrates the resulting FEM model 801 of a stow bin. After the safety margins are mapped on the CAD model of the structural product, the structure analyzer 104 can provide the mapping information to the display device 105. As also shown, the display device can display a visual representation of the safety margins on the CAD model 802 to facilitate the design of the structural product.

Figure 9:
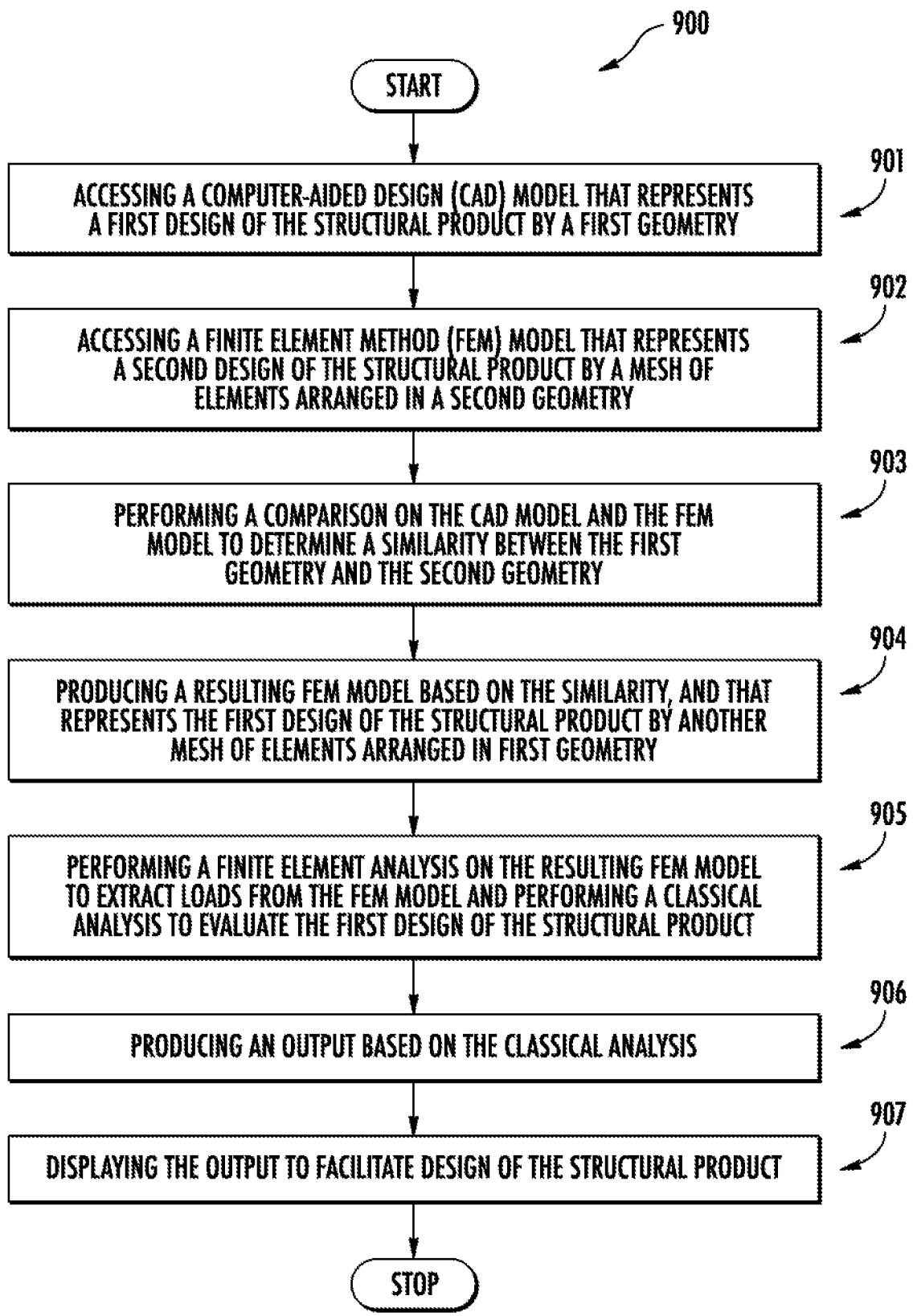
FIG. 9 is a flowchart illustrating various operations in a method of designing a structural product, according to various example implementations.

FIG. 9 is a flowchart illustrating various operations in a method 900 of designing a structural product, according to various example implementations. As shown at block 901, the method includes accessing a CAD model that represents a first design of the structural product by a first geometry. At block 902, the method includes accessing a FEM model that represents a second design of the structural product by a mesh of elements arranged in a second geometry. At block 903, the method includes performing a comparison of the CAD model and the FEM model to determine a similarity between the first geometry and the second geometry.

At block 904, the method 900 includes producing a resulting FEM model based on the similarity, and that represents the first design of the structural product by another mesh of elements arranged in the first geometry. At block 905, the method includes performing a finite element analysis on the resulting FEM model to extract loads from the FEM model and performing a classical analysis to evaluate the first design of the structural product. At block 906, the method includes producing an output based on the classical analysis. At block 907, the method includes displaying the output to facilitate design of the structural product. For example, the output can be utilized by engineers to design and/or manufacture the structural product.

According to example implementations of the present disclosure, the system 100 and its subsystems including the data access module 101, similarity comparator 102, model generator 103, structure analyzer 104 and display device 105 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 10:
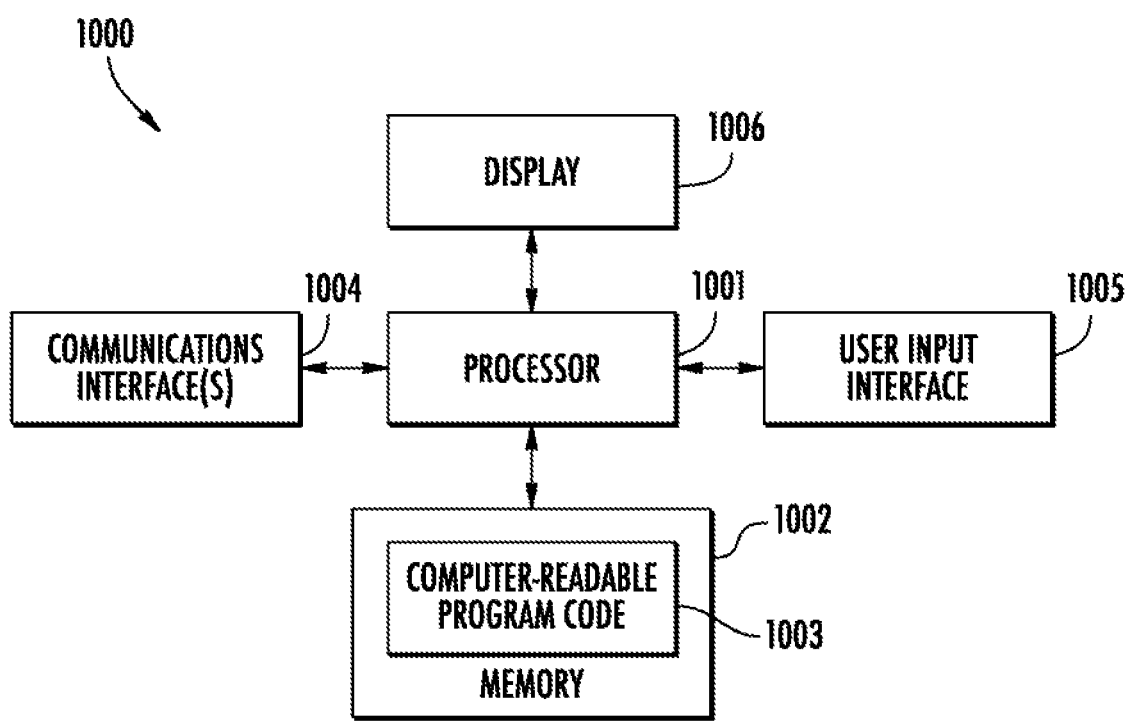
FIG. 10 illustrates an apparatus according to some example implementations.

FIG. 10 illustrates an apparatus 1000 according to some example implementations. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processor 1001 (e.g., processing circuitry) connected to a memory 1002 (e.g., storage device). In some examples, the apparatus 1000 implements the system 100.

The processor 1001 may be composed of one or more processors alone or in combination with one or more memories. The processor is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 1002 (of the same or another apparatus).

The processor 1001 may be a number of processors, a multi-core processor or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program. In either instance, the processor may be appropriately programmed to perform functions or operations according to example implementations of the present disclosure.

The memory 1002 is generally any piece of computer hardware that is capable of storing information such as, for example, data, computer programs (e.g., computer-readable program code 1003) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk—read only memory (CD-ROM), compact disk—read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 1002, the processor 1001 may also be connected to one or more interfaces for displaying, transmitting and/or receiving information. The interfaces may include a communications interface 1004 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 1006 and/or one or more user input interfaces 1005 (e.g., input/output unit). The display 1006 may correspond to the display device 105. The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processor that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 1000 may include a processor 1001 and a computer-readable storage medium or memory 1002 coupled to the processor, where the processor is configured to execute computer-readable program code 1003 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for designing a structural product, the apparatus comprising a processor and a memory storing executable instructions that, in response to execution by the processor, cause the apparatus to at least:
   access a computer-aided design (CAD) model that represents a first design of the structural product by a first geometry;
   access a finite element method (FEM) model that represents a second design of the structural product by a mesh of elements arranged in a second geometry;
   perform a comparison of the CAD model and the FEM model to determine a similarity between the first geometry and the second geometry;
   produce a resulting FEM model that depends on whether the similarity is at least a threshold similarity between the first geometry and the second geometry, or less than a threshold similarity, the resulting FEM model representing the first design of the structural product by another mesh of elements arranged in the first geometry, wherein when the similarity is at least the threshold similarity, production of the resulting FEM model includes the apparatus is caused to perform mesh morphing to modify the mesh of the FEM model to produce a morphed mesh that corresponds to the other mesh, and by which the resulting FEM model represents the first design of the structural product;
   perform a finite element analysis on the resulting FEM model to extract loads from the FEM model, and perform a second analysis to evaluate the first design of the structural product;

produce an output based on the second analysis; and
display the output to facilitate design of the structural product.

2. The apparatus of claim 1, wherein the similarity is at least the threshold similarity between the first geometry and the second geometry.

3. The apparatus of claim 1, wherein the apparatus is caused to perform the comparison to determine the similarity is less than the threshold similarity between the first geometry and the second geometry, and
wherein the apparatus is caused to:
decompose the CAD model into building blocks corresponding to a plurality of components of the structural product;
produce respective FEM models for the building blocks and thereby the plurality of components; and
assemble the respective FEM models with one or more connectors to produce the resulting FEM model.

4. The apparatus of claim 3, wherein the apparatus is caused to classify the building blocks into respective categories based on features of the building blocks, and
wherein the apparatus is caused to produce the respective FEM models based on the respective categories of the building blocks.

5. The apparatus of claim 3, wherein the memory stores further executable instructions that, in response to execution by the processor, cause the apparatus to further perform the second analysis on the respective FEM models to verify the plurality of components, and the apparatus is caused to produce the output based on the finite element analysis and the second analysis.

6. The apparatus of claim 5, wherein the output includes safety margins of the first design of the structural product, and the apparatus is caused to display a visual representation of the safety margins on the CAD model.

7. The apparatus of claim 1, wherein the structural product includes one or more interior commodities of an aircraft, and the apparatus is caused to facilitate design of the one or more interior commodities.

8. A method of designing a structural product, comprising:
accessing a computer-aided design (CAD) model that represents a first design of the structural product by a first geometry;
accessing a finite element method (FEM) model that represents a second design of the structural product by a mesh of elements arranged in a second geometry;
performing a comparison of the CAD model and the FEM model to determine a similarity between the first geometry and the second geometry;
producing a resulting FEM model that depends on whether the similarity is at least a threshold similarity between the first geometry and the second geometry, or less than a threshold similarity, the resulting FEM model representing the first design of the structural product by another mesh of elements arranged in the first geometry, wherein when the similarity is at least the threshold similarity, producing the resulting FEM model includes performing mesh morphing to modify the mesh of the FEM model to produce a morphed mesh that corresponds to the other mesh, and by which the resulting FEM model represents the first design of the structural product;
performing a finite element analysis on the resulting FEM model to extract loads from the FEM model and performing a second analysis to evaluate the first design of the structural product;
producing an output based on the second analysis; and
displaying the output to facilitate design of the structural product.

9. The method of claim 8, wherein the similarity is at least the threshold similarity between the first geometry and the second geometry.

10. The method of claim 8, wherein performing the comparison includes performing the comparison to determine the similarity is less than the threshold similarity between the first geometry and the second geometry, and wherein producing the resulting FEM model includes:
decomposing the CAD model into building blocks corresponding to a plurality of components of the structural product;
producing respective FEM models for the building blocks and thereby the plurality of components; and
assembling the respective FEM models with one or more connectors to produce the resulting FEM model.

11. The method of claim 10, wherein decomposing the CAD model includes classifying the building blocks into respective categories based on features of the building blocks, and wherein producing the respective FEM models includes producing the respective FEM models based on the respective categories of the building blocks.

12. The method of claim 10, further comprising performing the second analysis on the respective FEM models to verify the plurality of components, and producing the output includes producing the output based on the finite element analysis and the second analysis.

13. The method of claim 12, wherein the output includes safety margins of the first design of the structural product, and displaying the output includes displaying a visual representation of the safety margins on the CAD model.

14. The method of claim 8, wherein the structural product includes one or more interior commodities of an aircraft, and displaying the output to facilitate design of the structural product includes displaying the output to facilitate design of the one or more interior commodities.

15. A computer-readable storage medium for designing a structural product, the computer-readable storage medium being non-transitory and having computer-readable program code stored therein that in response to execution by a processor, causes an apparatus to at least:
access a computer-aided design (CAD) model that represents a first design of the structural product by a first geometry;
access a finite element method (FEM) model that represents a second design of the structural product by a mesh of elements arranged in a second geometry;
perform a comparison of the CAD model and the FEM model to determine a similarity between the first geometry and the second geometry;
produce a resulting FEM model that depends on whether the similarity is at least a threshold similarity between the first geometry and the second geometry, or less than a threshold similarity, the resulting FEM model representing the first design of the structural product by another mesh of elements arranged in the first geometry, wherein when the similarity is at least the threshold similarity, production of the resulting FEM includes the apparatus caused to perform mesh morphing to modify the mesh of the FEM model to produce a morphed mesh that corresponds to the other mesh, and by which the resulting FEM model represents the first design of the structural product;

perform a finite element analysis on the resulting FEM model to extract loads from the FEM model and perform a second analysis to evaluate the first design of the structural product;

produce an output based on the second analysis; and display the output to facilitate design of the structural product.

16. The computer-readable storage medium of claim 15, wherein the similarity is at least the threshold similarity between the first geometry and the second geometry.

17. The computer-readable storage medium of claim 15, wherein the apparatus is caused to perform the comparison to determine the similarity is less than the threshold similarity between the first geometry and the second geometry, and wherein the apparatus is caused to:

decompose the CAD model into building blocks corresponding to a plurality of components of the structural product;

produce respective FEM models for the building blocks and thereby the plurality of components; and assemble the respective FEM models with one or more connectors to produce the resulting FEM model.

18. The computer-readable storage medium of claim 17, wherein the apparatus is caused to classify the building blocks into respective categories based on features of the building blocks, and wherein the apparatus is caused to produce the respective FEM models based on the respective categories of the building blocks.

19. The computer-readable storage medium of claim 17, having further computer-readable program code stored therein that in response to execution by the processor, causes the apparatus to further perform the second analysis on the respective FEM models to verify the plurality of components, and the apparatus is caused to produce the output based on the finite element analysis and the second analysis.

20. The computer-readable storage medium of claim 19, wherein the output includes safety margins of the first design of the structural product, and the apparatus is caused to display a visual representation of the safety margins on the CAD model.

21. The computer-readable storage medium of claim 15, wherein the structural product includes one or more interior commodities of an aircraft, and the apparatus is caused to facilitate design of the one or more interior commodities.

\* \* \* \* \*

UNITED STATES PATENT AND TRADEMARK OFFICE
CERTIFICATE OF CORRECTION

PATENT NO. : 11,373,022 B2
APPLICATION NO. : 16/220615
DATED : June 28, 2022
INVENTOR(S) : Abad et al.

It is certified that error appears in the above-identified patent and that said Letters Patent is hereby corrected as shown below:

In the Claims

In Column 12, Claim 1, Line 54, "less than a threshold similarity" should read -- less than the threshold similarity --

In Column 12, Claim 1, Line 59, "the apparatus is caused to" should read -- the apparatus caused to --

In Column 13, Claim 8, Line 54, "less than a threshold similarity" should read -- less than the threshold similarity --

In Column 14, Claim 15, Line 58, "less than a threshold similarity" should read -- less than the threshold similarity --

Signed and Sealed this
Sixth Day of September, 2022

Katherine Kelly Vidal
*Director of the United States Patent and Trademark Office*